(12) United States Patent
Hirase et al.

(10) Patent No.: US 12,509,737 B2
(45) Date of Patent: Dec. 30, 2025

(54) METHOD FOR DETECTING TARGET MOLECULE

(71) Applicant: TOPPAN Inc., Tokyo (JP)

(72) Inventors: Takumi Hirase, Taito-ku (JP); Yoichi Makino, Taito-ku (JP)

(73) Assignee: TOPPAN Inc., Tokyo (JP)

( * ) Notice: Subject to any disclaimer, the term of this patent is extended or adjusted under 35 U.S.C. 154(b) by 1053 days.

(21) Appl. No.: 17/531,983

(22) Filed: Nov. 22, 2021

(65) Prior Publication Data

US 2022/0106648 A1    Apr. 7, 2022

Related U.S. Application Data

(63) Continuation of application No. PCT/JP2020/019992, filed on May 20, 2020.

(30) Foreign Application Priority Data

May 21, 2019    (JP) ................ 2019-095187

(51) Int. Cl.
G01N 33/53    (2006.01)
C12Q 1/70    (2006.01)
G01N 33/569    (2006.01)

(52) U.S. Cl.
CPC ....... C12Q 1/701 (2013.01); G01N 33/56983 (2013.01)

(58) Field of Classification Search
None
See application file for complete search history.

(56) References Cited

U.S. PATENT DOCUMENTS

| | | | |
|---|---|---|---|
| 2012/0196774 A1 | 8/2012 | Fournier et al. | |
| 2014/0364342 A1 | 12/2014 | Shimizu | |
| 2015/0087547 A1 | 3/2015 | Noji et al. | |
| 2016/0333400 A1 | 11/2016 | Makino et al. | |
| 2016/0339439 A1 | 11/2016 | Shimizu | |
| 2017/0176430 A1 | 6/2017 | Noji et al. | |
| 2017/0233790 A1 | 8/2017 | Makino et al. | |
| 2018/0067038 A1 | 3/2018 | Fathollahi et al. | |
| 2018/0196059 A1 | 7/2018 | Makino | |
| 2018/0250672 A1 | 9/2018 | Jamshidi et al. | |
| 2018/0306830 A1 | 10/2018 | Fournier et al. | |
| 2018/0346969 A1 | 12/2018 | Chang et al. | |
| 2018/0372741 A1 | 12/2018 | Matsumoto et al. | |
| 2019/0060897 A1 | 2/2019 | Makino et al. | |
| 2019/0241948 A1 | 8/2019 | Makino et al. | |
| 2020/0270674 A1 | 8/2020 | Hirase et al. | |
| 2022/0184622 A1 | 6/2022 | Jamshidi et al. | |

FOREIGN PATENT DOCUMENTS

| | | | |
|---|---|---|---|
| EP | 3 712 275 A1 | 9/2020 | |
| JP | 2014-503831 A | 2/2014 | |
| JP | 6183471 B2 | 8/2017 | |
| WO | WO 2013/151135 A1 | 10/2013 | |
| WO | WO 2016/006208 A1 | 1/2016 | |
| WO | WO 2016/043212 A1 | 3/2016 | |
| WO | WO 2016/072416 A1 | 5/2016 | |
| WO | WO 2016/149639 A1 | 9/2016 | |
| WO | WO 2017/043530 A1 | 3/2017 | |
| WO | WO 2017/056362 A1 | 4/2017 | |
| WO | WO 2017/095917 A1 | 6/2017 | |
| WO | WO 2017/188441 A1 | 11/2017 | |

OTHER PUBLICATIONS

International Search Report issued Aug. 25, 2020 in PCT/JP2020/019992, filed May 20, 2020, 9 pages (with English Translation).
Kim et al., "Large-scale femtoliter droplet array for digital counting of single biomolecules", Lab Chip, 12, pp. 4986-4991 2012.
Extended European Search Report issued Jun. 30, 2022, in European Patent Application No. 20809064.7, 10 pages.
European Office Action dated Nov. 17, 2025, in European Patent Application No. 20 809 064.7-1111 (10 pages).

*Primary Examiner* — Michail A Belyavskyi
(74) *Attorney, Agent, or Firm* — Oblon, McClelland, Maier & Neustadt, L.L.P.

(57) ABSTRACT

A method for detecting a target molecule of a structure body, including contacting a dispersion liquid including a structure body with a well array including wells such that the structure body is introduced into the wells, bringing a sealing solution into contact with the well array such that the structure body is sealed in at least one of the wells, extracting a content of the structure body in the well, detecting a surface target molecule present on a surface of the structure body in the well, and detecting an internal target molecule present inside the structure body in the well.

9 Claims, 7 Drawing Sheets

Specification includes a Sequence Listing.

METHOD FOR DETECTING TARGET MOLECULE

CROSS-REFERENCE TO RELATED APPLICATIONS

The present application is a continuation of International Application No. PCT/JP2020/019992, filed May 20, 2020, which is based upon and claims the benefits of priority to Japanese Application No. 2019-095187, filed May 21, 2019. The entire contents of all of the above applications are incorporated herein by reference.

REFERENCE TO A SEQUENCE LISTING

In accordance with 37 CFR § 1.52(e)(5), the present specification makes reference to a Sequence Listing (submitted electronically as a .txt file named "539584US Sequence Listing.txt". The .txt file was generated on Dec. 17, 2021 and is 2,595 bytes in size. The entire contents of the Sequence Listing are herein incorporated by reference.

BACKGROUND OF THE INVENTION

Field of the Invention

The present invention relates to a method for detecting a target molecule. More specifically, the present invention relates to a method for detecting a surface target molecule present on a surface of a structure and an internal target molecule present inside the structure and to a method and a kit for evaluating the structure.

Discussion of the Background

Early detection of disease and prediction of the effects of medication are performed by quantitatively detecting a target molecule in a biological sample. Conventionally, protein quantification has been performed by enzyme-linked immunosorbent assay (ELISA) or the like, and nucleic acid quantification has been performed by the real-time PCR method or the like.

In recent years, there is an increasing need for detecting a target molecule more accurately for the purpose of, for example, finding disease earlier. For example, PTL 1, PTL 2, and NPL 1 disclose techniques for performing an enzyme reaction in a large number of micro-compartments as techniques for accurately detecting a target molecule. These techniques are called digital counting.

In digital counting, a sample solution is divided into an extremely large number of minute solutions. Then, a signal from each minute solution is binarized, and the number of target molecules is counted by determining only whether the target molecule is present or not. The digital counting can significantly improve the detection sensitivity and the quantitativeness compared with conventional methods such as ELISA, the real-time PCR method, and the like.

In digital PCR, a mixture of a PCR reaction reagent and a nucleic acid is diluted so that the number of template nucleic acids present in a single microdroplet is zero or one. In digital PCR, in order to increase the sensitivity of nucleic acid amplification, and to perform nucleic acid amplification simultaneously for a large number of microdroplets, a smaller volume of each microdroplet is preferred. For example, PTL 3 discloses an array reaction vessel in which each well has a volume of 6 nL (nanoliters). In addition, PTL 1 discloses a method in which a sample is introduced into each well by allowing a sample to flow through a flow path in which a large number of wells having a depth of 3 µm and a diameter of 5 µm are formed, after which the excess reagent in the flow path is expelled with oil.

PTL 1: JP 6183471B
PTL 2: JP 2014-503831 A
PTL 3: WO2013/151135
NPL 1: Kim S. H., et al., Large-scale femtoliter droplet array for digital counting of single biomolecules., Lab on a Chip, 12 (23), 4986-4991, 2012.

SUMMARY OF THE INVENTION

According to an aspect of the present invention, a method for detecting a target molecule of a structure body, includes contacting a dispersion liquid including a structure body with a well array including wells such that the structure body is introduced into the wells, bringing a sealing solution into contact with the well array such that the structure body is sealed in at least one of the wells, extracting a content of the structure body in the well, detecting a surface target molecule present on a surface of the structure body in the well, and detecting an internal target molecule present inside the structure body in the well.

According to another aspect of the present invention, a kit for detecting a target molecule of a structure body includes a well array including wells, a reagent that extracts a content of the structure body, a reagent that detects a surface target molecule that is present on a surface of the structure body, and a reagent that detects an internal target molecule that is present inside the structure body.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
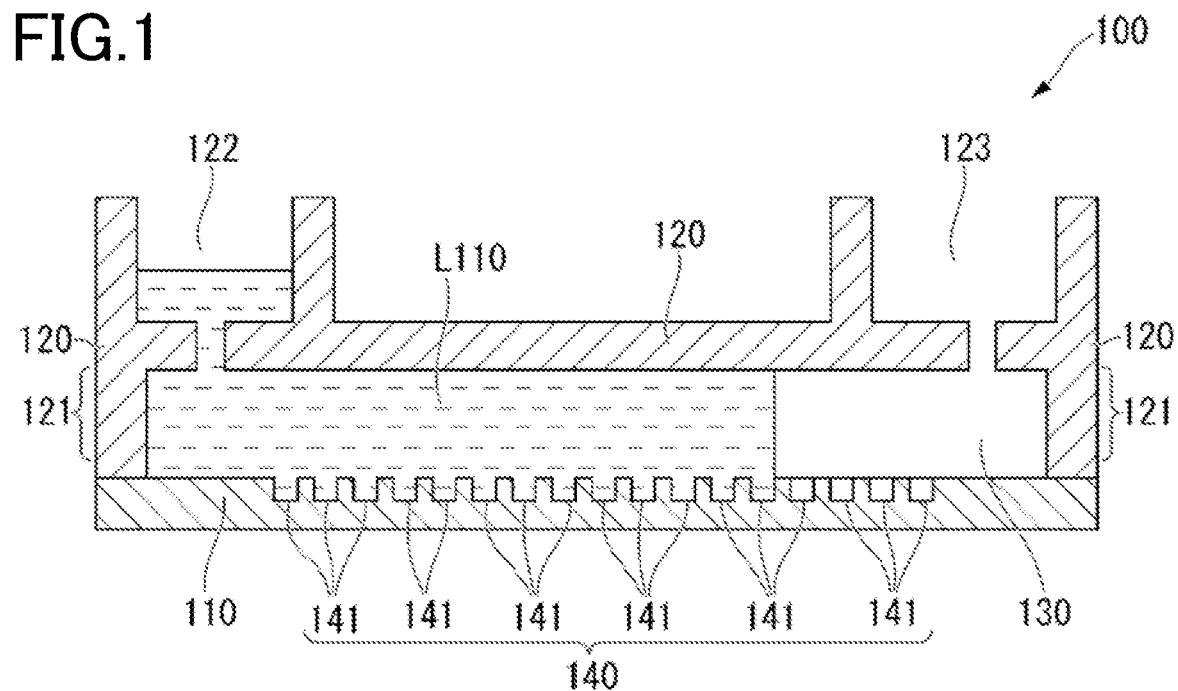
FIG. 1 is a schematic cross-sectional view of an example of a fluid device.

The embodiments will now be described with reference to the accompanying drawings, wherein like reference numerals designate corresponding or identical elements throughout the various drawings.

With reference to the drawings as appropriate, embodiments of the present invention will be described in detail. Note that in the drawings, the same or corresponding parts are denoted by the same or corresponding reference numerals, and redundant description is omitted. Further, the drawings are not necessarily to scale, and some of the dimensions are exaggerated for convenience of illustration.

Method for Detecting Surface Target Molecule and Internal Target Molecule of Structure One embodiment of the present invention provides a method for detecting a surface target molecule and an internal target molecule of a structure. The method includes bringing a dispersion liquid of structures into contact with a well array including wells and introducing the structures into the wells, bringing a sealing solution into contact with the well array to seal the structures in the wells, extracting contents of each structure in the associated well, detecting at least one type of surface target molecule present on a surface of each structure in the well, and detecting at least one type of internal target molecule present inside each structure in the well.

Note that, introducing the structures may be expressed as an introduction step. Similarly, extracting the contents of each structure may be expressed as an extraction step. Detecting the surface target molecule may be expressed as a surface target molecule detection step. Detecting the internal target molecule may be expressed as an internal target molecule detection step.

As described later in an example, the method according to the present embodiment detects at least one type of surface target molecule that is present on the surface of the structure and at least one type of internal target molecule that is present inside the structure.

In this description, the surface target molecule refers to a molecule that is exposed on the surface of the structure and that is to be detected. The internal target molecule refers to a molecule that is encapsulated in the structure and is not exposed on the surface and that is to be detected. To detect the internal target molecule, the contents of the structure need to be extracted to expose the internal target molecule.

The method according to the present embodiment allows easily detecting the surface target molecule and the internal target molecule at a level of single structure.

Structure

The structure is not limited to a particular structure and may be any structure as long as it has a surface on which the surface target molecule is exposed and an internal structure including the internal target molecule. Specific examples of the structure include a virus, an exosome, a cell, and an endoplasmic reticulum. Examples of the cell include a eukaryotic cell and a prokaryotic cell. Examples of the eukaryotic cell include an animal cell, a plant cell, an insect cell, a yeast cell, and a fungal cell. An example of the prokaryotic cell includes bacteria. Examples of the endoplasmic reticulum include a natural or artificial membrane vesicle constituted by an endoplasmic reticulum, which is a subcellular organelle, and a lipid membrane. The structure may be present in a biological sample. The biological sample is not limited, and examples thereof may include serum, plasma, urine, and the like.

Well

The well array includes multiple wells. The shape and the position of each well are not particularly limited as long as each well has the dimension that allows accommodating the above-described structure and later-described reagents that are used in the extraction of the contents of the structure, detection of the surface target molecule, and detection of the internal target molecule.

The wells may be used without treatment, or depending on the purpose, an extraction reagent that extracts the contents of the structure, an antibody, a specific binding substance to the structure, and the like may be immobilized on the inner wall of the wells in advance.

Fluid Device

FIG. 1 is a schematic cross-sectional view of an example of a fluid device. As shown in FIG. 1, a well array 140 may be located adjacent to a flow path 130 of a fluid device 100, which includes the flow path 130. As shown in FIG. 1, the fluid device 100 includes a substrate 110, a cover member 120 (which may be simply referred to as the cover 120) located to face the substrate 110. The cover member 120 includes a protruding portion 121. The distal end of the protruding portion 121 is in contact with the substrate 110. In the fluid device 100, the well array 140 is formed integrally with the substrate 110 on one surface of the substrate 110 and faces the cover member 120. The well array 140 includes multiple wells 141. The wells are connected to the flow path 130. The cover member 120 may be welded or bonded to the substrate 110.

The wells 141 are open to the surface of the substrate 110. The shape, size, and arrangement of the wells 141 are not particularly limited. However, it is preferred that one structure is introduced into each well 141. The wells 141 are preferably microwells of a small volume. For example, the volume of each well 141 may be approximately 10 fL to 100 pL. In the fluid device 100, the wells 141 having the same shape and the same size constitute the well array 140. The expression "the same shape and the same size" refers to the shape and the volume being the same to the extent required for digital counting, and a variation approximately within a manufacturing error may be accepted.

The diameter of each well 141 may be approximately 1 to 10 μm, for example. The depth of each well 141 may be approximately 1 to 10 μm, for example. The arrangement of the wells 141 is not limited and, for example, may be arranged like a triangular grid or a square grid, or may be located randomly.

In the fluid device 100, the existence of the protruding portion 121 forms a space between the well array 140 and the cover member 120. The space constitutes the flow path 130. The flow path 130 functions as a path for supplying a dispersion liquid of the structures and a sealing solution. The shape, structure, capacity, and the like of the flow path 130 are not particularly limited. The height of the flow path 130, that is, the distance between the surface of the substrate 110 and the surface of the cover member 120 facing the substrate 110 may be, for example, 500 μm or less, for example, 300 μm or less, for example, 200 μm or less, or for example, 100 μm or less.

The protruding portion 121 may be formed integrally with the cover member 120. For example, the cover member 120 is formed into a plate shape having the protruding portion 121 by molding a fluid of a thermoplastic resin using a mold. The cover member 120 may include an inlet port 122 and a discharge port 123 for reagents.

When the cover member 120 includes the protruding portion 121, the cover member 120 and the substrate 110 are stacked so that the protruding portion 121 comes into contact with the surface of the substrate 110 on which the wells 141 are open. As a result, the space between the cover member 120 and the substrate 110 defines the flow path. The cover member 120 and the substrate 110 may be welded by, for example, laser welding.

Modification 1 of Fluid Device

Figure 4:
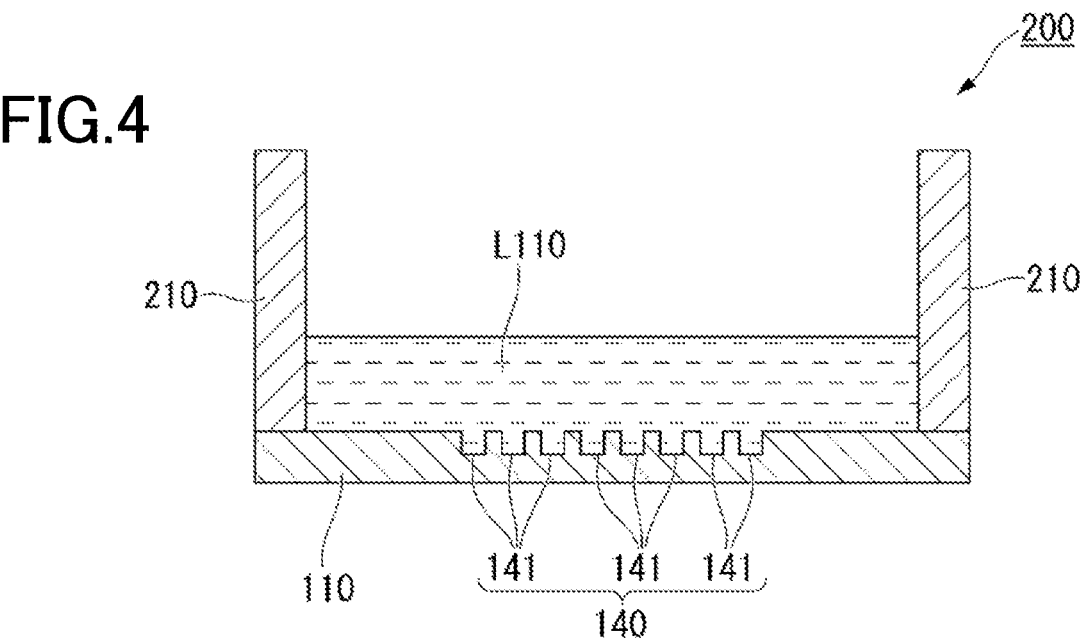
FIG. 4 is a schematic cross-sectional view of an example of a fluid device.

The fluid device used in the method according to the present embodiment is not limited to the above-described fluid device 100. FIG. 4 is a schematic cross-sectional view of an example of a fluid device. As shown in FIG. 4, a fluid device 200 includes the substrate 110 and a wall member 210 (which may be simply referred to as the wall 210). In the fluid device 200, the well array 140 is formed integrally with the substrate 110 on one surface of the substrate 110. The well array 140 includes multiple wells 141.

The fluid device 200 mainly differs from the fluid device 100 in that the fluid device 200 does not have the cover member 120. Thus, the fluid device 200 does not have the flow path.

Modification 2 of Fluid Device

In the fluid device 100 described above, the cover member 120 and the protruding portion 121 are integrally formed. However, the cover member 120 and the protruding portion 121 may be formed as separate members.

The well array 140 is formed integrally with the substrate 110 on one surface of the substrate 110 in the fluid device 100 and the fluid device 200, which are described above. However, the well array does not necessarily have to be formed integrally with the substrate 110. For example, the well array 140 that is formed as a separate member from the fluid device 100 may be located on the substrate 110 of the fluid device. Alternatively, a plastic layer may be laminated on the surface of the substrate 110, and the well array may be formed on the plastic layer by, for example, etching.

Modification 3 of Fluid Device

In the fluid device 100 described above, the well array is formed on the substrate 110. However, the well array may be provided on the cover member 120. As another aspect, a well array molded as a separate member from the fluid device 100 may be located on the cover member 120 of the fluid device 100. Alternatively, a plastic layer may be laminated on the surface of the cover member 120, and the well array may be formed on the plastic layer by, for example, etching. Alternatively, the well array may be directly formed on the surface of the cover member 120.

Material of Fluid Device

The substrate 110 is formed of, for example, plastic. Although the type of plastic is not particularly limited, the plastic is preferably resistant to reagents and a sealing solution. When the signal to be detected is fluorescence, the plastic preferably has low autofluorescence. For example, a cycloolefin polymer, a cycloolefin copolymer, silicone, polypropylene, polycarbonate, polystyrene, polyethylene, polyvinyl acetate, a fluororesin, or an amorphous fluororesin may be used, but it is not limited to these.

The substrate 110 may have the wells 141 formed on one surface in the thickness direction. In other words, the wells 141, which have a depth in the thickness direction, may be formed on one surface of the substrate 110. Examples of the method for forming the wells using plastic include injection molding, thermal imprinting, and optical imprinting.

Alternatively, for example, fluororesin may be laminated on the substrate 110, and the well array may be formed by processing the fluororesin by, for example, etching. The fluororesin may be, for example, CYTOP (registered trademark) (AGC Inc.).

When the fluid device has the cover member 120, the cover member 120 is preferably made of plastic with low autofluorescence and may be made of, for example, a thermoplastic resin such as a cycloolefin polymer and a cycloolefin copolymer.

Further, the cover member 120 may also be formed of a material that does not transmit light of a wavelength near the wavelength detected in fluorescence observation of a signal or a material that does not allow any light to be transmitted therethrough. For example, the cover member 120 may be formed of a thermoplastic resin to which carbon, metal particles, or the like is added.

Conventional Method for Detecting Target Molecule

The conventional method for detecting the target molecule by digital counting when the fluid device 100 is used as an example will be described with reference to FIGS. 1 to 3.

As shown in FIG. 1, a reagent solution L110 is introduced through the inlet port 122 of the fluid device 100 and supplied to the flow path 130. The reagent solution L110 contains target molecules. The concentration of the target molecules contained in the reagent solution L110 is adjusted to a concentration so that one or less than one target molecule per well enters the wells 141. The reagent solution L110 supplied to the flow path 130 is accommodated inside the wells 141.

Figure 2:
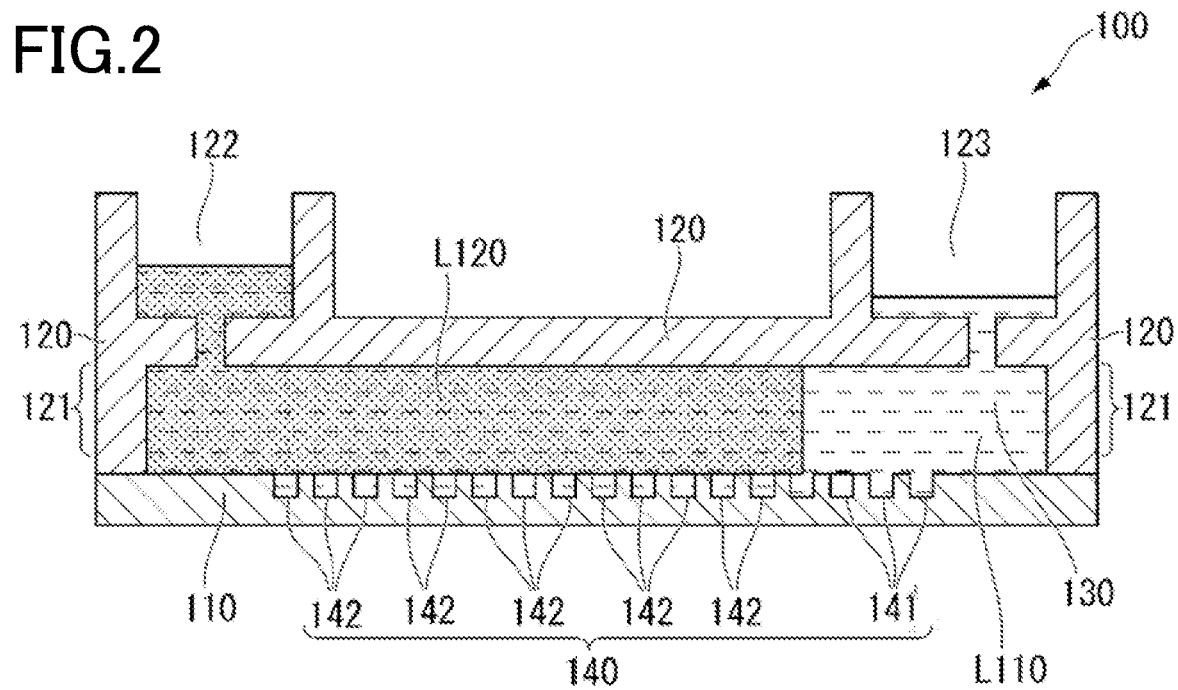
FIG. 2 is a schematic cross-sectional view of the example of the fluid device.

Then, as shown in FIG. 2, a sealing solution L120 is supplied through the inlet port 122 of the cover member 120 into the flow path 130 between the substrate 110 and the cover member 120 to individually seal each of the wells 141. The sealing solution may be, for example, oil. The sealing solution L120 expels and replaces the reagent solution L110 that is not accommodated in the wells 141 among the reagent solution L110 supplied to the flow path 130. Thus, the sealing solution L120 individually seals each of the wells 141, which accommodate the reagent solution L110 containing a target molecule. Each well 141 forms an independent reaction space, that is, a micro-compartment 142.

Figure 3:
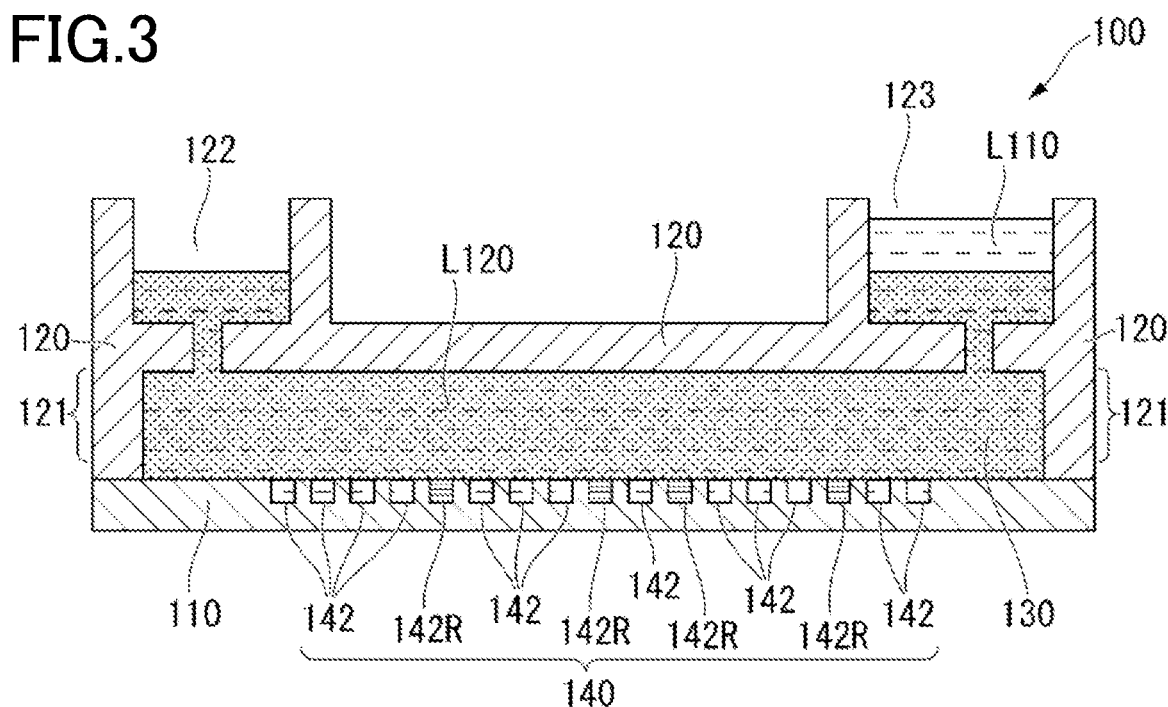
FIG. 3 is a schematic cross-sectional view of the example of the fluid device.

Subsequently, as shown in FIG. 3, a predetermined reaction occurs in each well 141, and the generated signal is observed. Wells 142R are the wells in which signals are detected, and the wells 142 are the wells in which no signal is detected.

In detecting a target molecule such as a nucleic acid or a protein contained in a structure such as a cell or a virus, the conventional detection method extracts the target molecules from the structures in advance and mixes the target molecules in the reagent solution L110 to be supplied. Thus, some of the target molecules may be lost and their number reduced during extraction of the target molecules from the structures and in the liquid supplying step. In addition, there may be a case where target molecules are not accommodated in the wells 141 and left in the flow path 130. Such target molecules are expelled by the sealing solution L120, resulting in a failure in observation of a signal amplification reaction in the reaction step, and thus a failure in detection of the presence. As a result, the target molecule in the structure is sometimes not detected accurately. Even when the target molecule is detected, the detected target molecule cannot be associated with the structure.

Subsequently, the conventional method for detecting the target molecule by digital counting when the fluid device 200 is used as an example will be described with reference to FIGS. 4 to 6. In this case, the detection is performed using the method disclosed in WO 2016/006208.

As shown in FIG. 4, the reagent solution L110 is introduced into the fluid device 200. The reagent solution L110 contains target molecules. The concentration of the target molecules contained in the reagent solution L110 is adjusted to a concentration so that one or less than one target molecule per well enters the wells 141. The reagent solution L110 is accommodated inside the wells 141.

Figure 5:
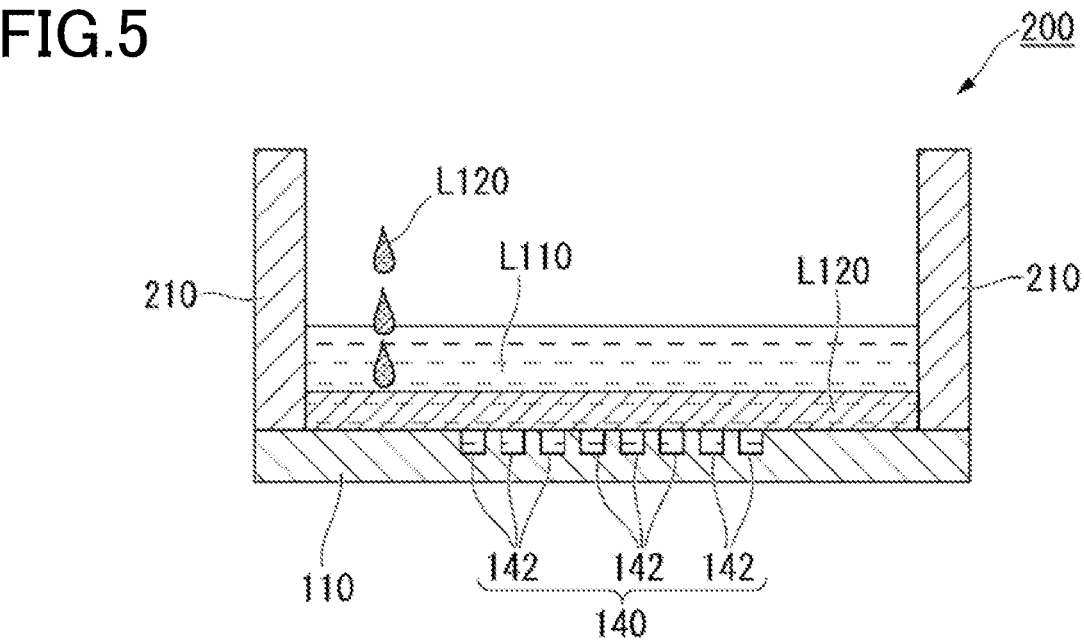
FIG. 5 is a schematic cross-sectional view of the example of the fluid device.

Subsequently, as shown in FIG. 5, the sealing solution L120 is introduced into the fluid device 200. The specific gravity of the sealing solution L120 is greater than that of the reagent solution L110. Thus, the sealing solution L120 sinks lower than that part of the reagent solution L110 that is not accommodated in the wells 141 and comes into contact with the well array 140. The sealing solution L120 individually seals each of the wells 141, which accommodate the reagent solution L110 containing the target molecule. Each well 141 forms an independent reaction space, that is, the microcompartment 142.

Figure 6:
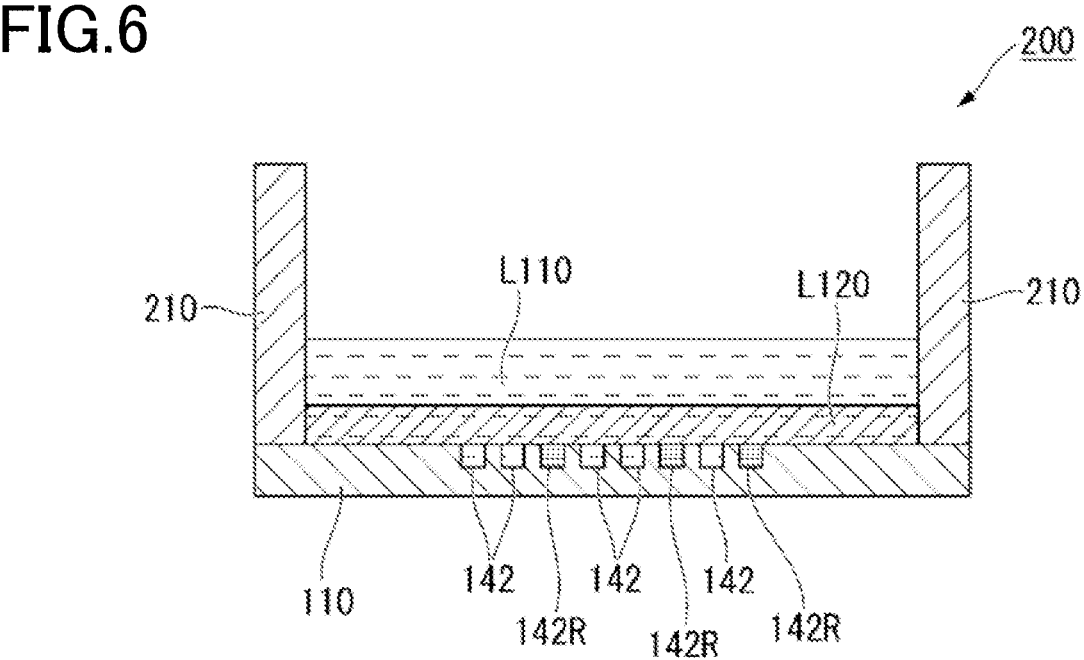
FIG. 6 is a schematic cross-sectional view of the example of the fluid device.

Subsequently, as shown in FIG. 6, a predetermined reaction occurs in each well 141, and the generated signal is observed. Wells 142R are the wells in which signals are detected, and the wells 142 are the wells in which no signal is detected.

Detection Method of Present Embodiment

Subsequently, the method of the present embodiment when the fluid device 100 is used as an example will be described with reference to FIGS. 1 to 3 as required. The method of the present embodiment is a method for detecting a surface target molecule and an internal target molecule of a structure. The method includes bringing a dispersion liquid of structures into contact with a well array including multiple wells and introducing the structures into the wells, bringing a sealing solution into contact with the well array to seal the structures in the wells, extracting contents of each structure in the associated well, detecting at least one type of surface target molecule present on a surface of each structure in the well, and detecting at least one type of internal target molecule present inside each structure in the well.

According to the method of the present embodiment, the surface target molecule and the internal target molecule are associated with the structure when they are detected. That is, the surface target molecule and the internal target molecule can be detected at a level of single structure. According to the method of the present embodiment, when the surface target molecule and the internal target molecule are detected, it can be understood that the surface target molecule and the internal target molecule were present on the surface of and inside a single structure.

According to the method of the present embodiment, two or more types of target molecules including the surface target molecule and the internal target molecule can be detected. Also, multiple types of surface target molecules can be detected. Furthermore, multiple types of internal target molecules can be detected.

Introduction of Structures into Wells

In the present step, as shown in FIG. 1, the reagent solution L110 is introduced through the inlet port 122 of the fluid device 100 and supplied to the flow path 130. The reagent solution L110 is a dispersion liquid of the structures. The reagent solution L110 includes reagents for detecting the surface target molecule and the internal target molecule. At the point in time when the reagent solution L110 is supplied to the flow path 130, the reagent for detecting the surface target molecule may be, but does not necessarily have to be, bound to the surface target molecule.

In the conventional method, the reagent solution L110 contains the target molecules that are previously extracted from the structures. The method of the present embodiment differs from the conventional technique in that the reagent solution L110 includes the structures themselves. That is, the reagent solution L110 contains the structures.

The reagent solution L110 supplied to the flow path 130 comes into contact with the well array 140. The reagent solution L110 is accommodated inside each well 141. As a result, the structure is introduced into each well 141.

The number of structures introduced in each well in the introduction step is not limited. Preferably, 1 or less than 1, that is, 0 or 1 structure is introduced into each well. This enables detection of the structure in units of one piece, or enables digital counting. Further, the structure does not necessarily have to be introduced into every well of the well array.

A means for introducing the structure into the well is not limited, and an appropriate means for the selected structure can be used. For example, structures may precipitate by their own weight in the fluid device (in the flow path) and be distributed into the respective wells. Alternatively, a substance (capture substance) that captures a structure by the method described below may be used to allow the capture substance to bind to a structure that is unlikely to precipitate by its own weight, so that a complex is formed and supplied. Further, the capture substance may be previously immobilized to each well to allow the capture substance to capture the supplied structure and form a complex. This improves the efficiency in introducing the structure into each well.

The structures may be introduced to the wells by binding the capture substance having a specific gravity smaller than that of the reagent solution L110 to each structure and supplying the reagent solution L110. In this case, the structures are introduced to the wells by supplying the reagent solution L110 in a state in which the fluid device 100 is placed upside down so that the substrate 110 is on the upper side and the cover member 120 is on the lower side. Furthermore, when the fluid device described in Modification 3 of the fluid device is used, the structures are introduced to the wells formed in the cover member 120. When the specific gravity of the structures is smaller than that of the reagent solution L110, the structures are introduced to the wells by the same method.

The step of binding the capture substance to the structure can be performed at any time during the method of the present embodiment. For example, the step may be performed by bringing the structure and the capture substance into contact with each other in a sample tube before introducing the structure into the well. The structure may be brought into contact with the capture substance by adding the capture substance into the reagent solution L110 containing the structures. Further, the structure and the capture substance may be brought into contact with each other and then be mixed with a solution containing reagents for detecting the surface target molecule and the internal target molecule. Alternatively, after the capture substance is introduced to each well, the structure may be introduced to each well, so that the capture substance and the structure are brought into contact with each other in each well and form a complex.

The capture substance is a substance capable of capturing the structure. The capture substance may be, for example, a bound body of a solid phase and a specific binding substance to the structure. Further, the specific binding substance may be an antibody.

Examples of the solid phase include particles, a film, and a substrate. Further, the specific binding substance to the structure may be at least one type. There may be, for example, three types, four types, or five or more types of specific binding substances.

The particles are not limited, and polymer particles, magnetic particles, glass particles, and the like can be used. The particles are preferably subjected to a surface treatment in order to avoid nonspecific adsorption. Further, in order to immobilize the specific binding substance, particles having a functional group such as a carboxyl group on the surface are preferred. More specifically, particles manufactured by JSR Corporation under the trade name "Magnosphere LC300" or the like can be used.

Alternatively, for example, when a virus is used as the structure, a cell to which the virus can be attached (that is, a cell having a virus receptor) can be used as the capture substance.

Examples of the specific binding substance include antibodies, antibody fragments, aptamers, lectins, and the like. Examples of the antibody fragments include Fab, F(ab')$_2$, Fab', a single-chain antibody (scFv), a disulfide-stabilized antibody (dsFv), a dimeric V region fragment (Diabody), peptide including CDR, and the like. The antibody may be a monoclonal antibody or a polyclonal antibody. Alternatively, the antibody may be a commercially available antibody.

The method of immobilizing the specific binding substance on the surface of the particle is not limited, and it is possible to use a method using physical adsorption, a method using chemical bonding, a method using avidin-biotin binding, a method using a bond between protein G or protein A to an antibody, or the like. As the method using physical adsorption, there is a method of immobilizing a specific binding substance on the particle surface by hydrophobic interaction or electrostatic interaction. As the method using chemical bonding, there is a method using a cross-linking agent. For example, in the case where the surface of the particle has a hydroxyl group, the carboxyl group of the specific binding substance is allowed to react with a cross-linking agent to obtain an active ester, and then the hydroxyl group and the ester group are allowed to react, whereby the specific binding substance can be immobilized on the particle surface. It is also preferable to provide a spacer between the specific binding substance and the particle surface so as not to inhibit the recognition ability of the specific binding substance to recognize the target molecule.

As described above, the introduction of the structures into the wells may be performed using the capture substance. For example, complexes of the capture substance and the structure may be supplied to the flow path and introduced into the wells.

Preferably, the complexes of the capture substance and the structure are formed under the condition that 0 or 1 structure is captured by one capture substance. Furthermore, each well is preferably configured to introduce 0 or 1 capture substance. This enables digital counting. That is, in the present embodiment, detection of the structure may be performed in units of one item. In this case, the surface target molecule and the internal target molecule are detected at a level of single structure.

Sealing of Structure in Well

In the present step, as shown in FIG. 2, the sealing solution L120 is supplied to the flow path 130 between the substrate 110 and the cover member 120 through the inlet port 122 of the cover member 120. The sealing solution L120 supplied to the flow path 130 comes into contact with the well array 140. The sealing solution L120 expels and replaces the reagent solution L110 that is not accommodated in the wells 141, of the reagent solution L110 supplied to the flow path 130. Thus, the sealing solution L120 individually seals each of the wells 141, which accommodate the reagent solution L110 containing the structure. Each well 141 forms an independent reaction space, that is, the micro-compartment 142.

The sealing solution is a liquid that can individually seal the liquid introduced in the wells to prevent mixture of the liquid and form liquid droplets, that is, microdroplets. The sealing solution is preferably an oily solution, and more preferably an oil. Examples of the oil include a fluorine-based oil, a silicone-based oil, a hydrocarbon-based oil, and a mixture thereof. More specifically, the oil manufactured by Sigma under the trade name "FC-40" or the like can be used. FC-40 (CAS Number: 86508-42-1) is a fluorinated aliphatic compound and has a specific gravity of 1.85 g/mL at 25° C.

Extracting Contents of Structure

In the present step, the contents of the structure are extracted in each well 141. In the present step, the contents including the internal target molecule are extracted from the structure. In extracting the contents, all the target molecules may be extracted from the structure, or only some of the target molecules included in the structure may be extracted.

The method for extracting a target molecule from the structure is not limited, and known techniques can be used. For example, physical techniques using heat, ultrasonic waves, light, magnetic force, electromagnetic waves, or the like, chemical techniques using an extractant such as surfactants, antibiotics, osmotic pressure inducers, and necrosis or apoptosis inducers, and a combination thereof may be used.

The surfactants are desirably those that destabilize the structure. Specific examples of the surfactants include Triton-X100 (also referred to as polyethylene glycol mono-4-octylphenyl ether (n=approximately 10)), sodium dodecyl sulfate, Nonidet P-40 (also referred to as octylphenoxy poly(ethyleneoxy)ethanol), and Tween 20 (also referred to as polyoxyethylene sorbitan monolaurate). The extractant may be a reagent including a surfactant. Examples of the reagent including a surfactant include BugBuster (manufactured by Merck Millipore Ltd.).

More specifically, when heat is used as the extraction method, the structure only needs to be heated to a temperature sufficient to destabilize the structure. The fluid device is preferably heated at 70° C. or more and 90° C. or less, more preferably 75° C. or more and 85° C. or less, e.g., approximately 80° C., for at least 5 minutes, preferably at least 10 minutes, e.g., approximately 15 minutes or approximately 30 minutes to thereby extract the target molecule from the structure.

When heat is used as the extraction method, the contents of the structure may be extracted by heating the structure in the liquid containing the surfactant.

When an extractant is used, the structures and the extractant are brought into contact with each other at a given point in time of the method according to the present embodiment. For example, the structures and the extractant may be mixed before the introduction step, and subsequently, the mixed liquid may be supplied and introduced into the wells. After that, the sealing step is performed.

In this case, the extraction conditions may be designed so that the target molecule is extracted from the structure in each well after the well is sealed by a method such as adjusting the mixing ratio between the structures and the extractant. Alternatively, a dispersion liquid of the structures may be supplied after the extractant is introduced into the wells so that they are in contact with each other in the wells. After that, the sealing step is performed.

After each well is sealed, the structure is disrupted due to the effect of the extractant in the well, and the internal target molecule is extracted.

The extraction step is performed in each well after the well is sealed. This can prevent the loss of target molecules. As a result, the target molecule can be detected with high accuracy compared with a conventional method in which the target molecules are distributed into the respective wells of a micro array by using a flow path after they are extracted from the structures.

Figure 7A:
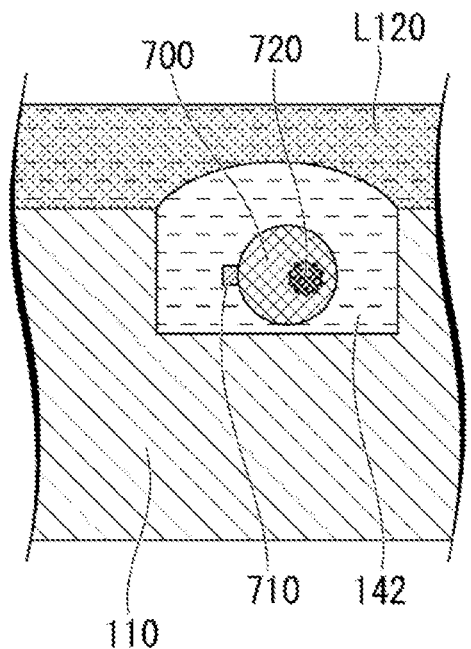
FIG. 7A is a schematic view illustrating the state in which a structure is accommodated in a micro-compartment formed by a well and a sealing solution L120.

FIG. 7A is a schematic view illustrating the state in which a structure 700 including a surface target molecule 710 and an internal target molecule 720 is accommodated in the micro-compartment 142 formed by the well 141 and the sealing solution L120.

Figure 7B:
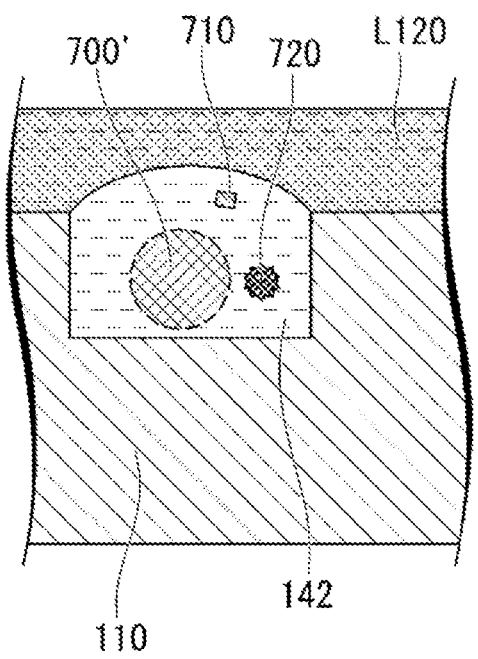
FIG. 7B is a schematic view illustrating the state in which an internal target molecule is extracted from the structure after an extraction step.

FIG. 7B is a schematic view illustrating the state after the structure in the state of FIG. 7A has been subjected to the extraction step. As shown in FIG. 7B, after the extraction step, the internal target molecule 720 is extracted from a structure 700'.

Figure 8A:
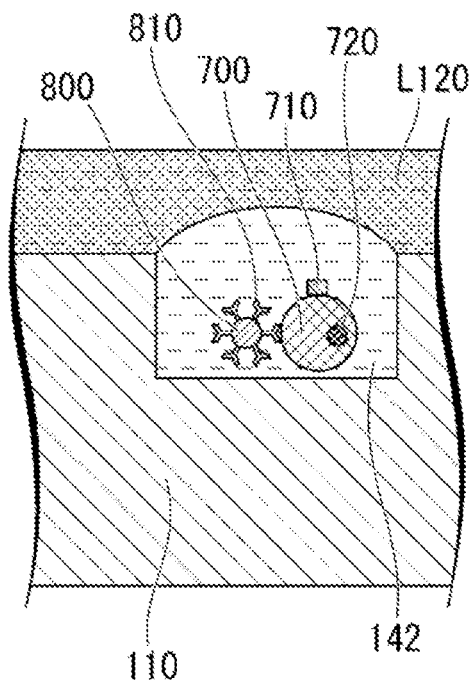
FIG. 8A is a schematic view illustrating the state in which the structure is introduced and sealed in the well using a capture substance and is accommodated in the micro-compartment formed by the well and the sealing solution.

FIG. 8A is a schematic view illustrating the state in which the structure 700 including the surface target molecule 710 and the internal target molecule 720 is introduced and sealed in the well using a capture substance 800 and is accommodated in the micro-compartment 142 formed by the well 141 and the sealing solution L120. A specific binding substance 810 to the structure 700 is bound to the capture substance 800.

Figure 8B:
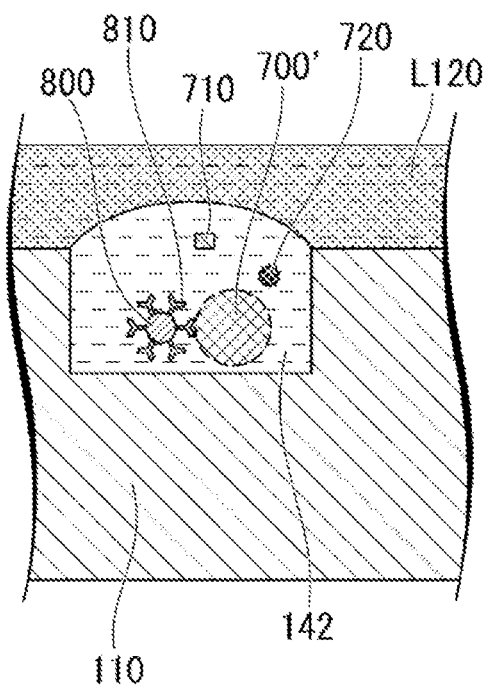
FIG. 8B is a schematic view illustrating the state in which the internal target molecule is extracted from the structure after the extraction step.

FIG. 8B is a schematic view illustrating the state after the structure shown in FIG. 8A has been subjected to the extraction step. As shown in FIG. 8B, after the extraction step, the internal target molecule 720 is extracted from the structure 700'.

Surface Target Molecule Detection Step

In the present step, at least one type of surface target molecule present on the surface of the structure is detected in the well 141.

Examples of the surface target molecule include at least one type of molecule selected from a group consisting of a nucleic acid, a protein, a sugar, a glycoprotein, a lipid, and a complex thereof. Examples of the nucleic acid include DNA, RNA, miRNA, and mRNA. Examples of the protein include a structural protein, a membrane protein, and an enzyme.

The structure includes a target molecule. In the specification of the present application, the expression that the structure "includes" a target molecule can refer to that the structure encapsulates a target molecule or that a part or the entirety of the target molecule is present on the surface of the structure.

Any known detection method can be used as the method for detecting the surface target molecule depending on the characteristics of the target molecule to be detected. For example, a reaction for amplifying a signal derived from the target molecule to a detectable level (signal amplification reaction) can be first performed as necessary, and then the amplified signal can be detected by using an appropriate means. In the present embodiment, the step of detecting the surface target molecule may be performed by a nucleic acid detection technique.

Examples of the signal that can be used in the detection method according to the present embodiment include fluorescence, chemiluminescence, color development, potential change, and pH change.

The signal amplification reaction may be, for example, a biochemical reaction, and more specifically, an enzymatic reaction. As an example, the signal amplification reaction may be an isothermal reaction in which, while a reagent solution containing an enzyme for signal amplification is accommodated in the wells, the fluid device is maintained at a constant temperature condition under which a desired enzyme activity is obtained, for example, a constant temperature of 60° C. or more and 75° C. or less, and preferably approximately 66° C., for a predetermined period of time, for example, at least 10 minutes, and preferably approximately 15 minutes.

Specific examples of the signal amplification reaction include, when a nucleic acid detection technique is used, an invasive cleavage assay (ICA) method, a loop-mediated isothermal amplification (LAMP) method (registered trademark), a 5'→3' nuclease method (TaqMan) method (registered trademark), and a fluorescent probe method. In particular, use of an ICA reaction is preferred.

This is related to the principle of the ICA reaction that the signal amplification proceeds by two reaction cycles of (1) complementary binding between nucleic acids, and (2) recognition and cleavage of a triple-stranded structure by an enzyme.

In the ICA reaction, influence of contaminants other than the target molecule on the reaction cycle is small. Therefore, even if various components present in the structure other than the target molecule are released into a micro-compartment during the extraction of the contents from the structure, the target molecule can be accurately detected by using the ICA reaction. For example, when the ICA reaction is used for the signal amplification reaction, the reagent solution L110 (liquid for dispersing the structure) includes a reaction reagent and a template nucleic acid required for the ICA reaction.

When the ICA reaction is used, specifically, an ICA reaction reagent such as an allele probe, an ICA oligo, a flap endonuclease-1 (FEN-1), and a fluorescent substrate may be contained in the reagent solution L110.

The reagent solution L110 may be one generally used in a biochemical analysis performed by using a fluid device and is preferably an aqueous solution. A surfactant or the like may be included in the reagent solution L110 in order to facilitate sealing of the well with liquid. Alternatively, the reagent solution L110 may include an extractant used for the extraction of the contents of the structure. However, it is difficult to include the extractant in the reagent solution L110 since the extractant sometimes deactivates the enzyme that causes a biochemical reaction.

When the biochemical reaction in detecting the surface target molecule is an ICA reaction, and the target molecule is present in the well, due to an enzymatic reaction based on the isothermal reaction, a fluorescent substance is released from the quenching substance, which results in a specified fluorescence signal being emitted corresponding to the excitation light.

Alternatively, the surface target molecule can also be detected by binding, to the target molecule, a specific binding substance that binds to the surface target molecule and detecting the specific binding substance that has been bound.

For example, when the surface target molecule is a protein, the ELISA method can be used for detection. More specifically, the detection may also be performed by, for example, sandwich ELISA using the principle of fluorescence resonance energy transfer (FRET).

In performing sandwich ELISA using the principle of FRET, first, a first specific binding substance (e.g., antibody) labeled with a first fluorescent substance (donor), and a second specific binding substance labeled with a second fluorescent substance (acceptor) and having a light-absorbing wavelength that overlaps a fluorescence wavelength of the first fluorescent substance are prepared. Then, a surface target molecule (e.g., antigen) is brought into contact with both the first specific binding substance and the second specific binding substance to form a complex. Once a complex is formed, the distance between the donor and the acceptor decreases, and the fluorescence wavelength of the acceptor can be detected in response to the exposure to an excitation wavelength of the donor.

Alternatively, the specific binding substance may be labeled with a nucleic acid fragment, and then the nucleic acid fragment can be detected by the ICA reaction.

Examples of the specific binding substance include antibodies, antibody fragments, and aptamers. In order to detect a specific binding substance bound to the target molecule, the specific binding substance may be directly or indirectly labeled by, for example, an enzyme such as horseradish peroxidase (HRP). When two or more specific binding substances are used, each of the specific binding molecules is labeled so that each can be identified.

A signal observation method may be selected from known appropriate methods depending on the type of signal to be observed. For example, when bright field observation is performed, the substrate provided with the well array is irradiated with white light in a perpendicular direction. When fluorescence signal observation is performed, the excitation light corresponding to the fluorescent substance is projected to the inside of the wells to observe fluorescence emitted from the fluorescent substance.

Detection of Internal Target Molecule

In the present step, at least one type of internal target molecule present inside the structure is detected in the well 141.

Examples of the internal target molecule include, like the surface target molecule, at least one type of molecule selected from a group consisting of a nucleic acid, a protein, a sugar, a glycoprotein, a lipid, and a complex thereof. For example, the surface target molecule may include a protein, and the internal target molecule may include a nucleic acid.

The internal target molecule can be detected in the same manner as the surface target molecule described above. In particular, the internal target molecule is preferably detected by the nucleic acid detection technique. The nucleic acid detection technique is preferably the ICA method.

For example, the surface target molecule is detected using a nucleic acid-labeled antibody, and the nucleic acid labeled on the nucleic acid-labeled antibody is detected by the ICA method. Further, when the internal target molecule is a nucleic acid, the nucleic acid is detected by the ICA method.

In this manner, even when the surface target molecule and the internal target molecule are different molecules, the labeling will allow detection using the same principle. In the above case, the surface target molecule and the internal target molecule can both be detected by the ICA method. Thus, the surface target molecule and the internal target molecule are simultaneously detected under the same condition.

According to the method of the present embodiment, the extraction of the contents of the structure, the detection of the surface target molecule, and the detection of the internal target molecule are preferably performed after the sealing of the structure in each well. Thus, the surface target molecule and the internal target molecule derived from one structure are detected. The surface target molecule and the internal target molecule are associated with the structure when they are detected.

The surface target molecule and the internal target molecule can be detected in any order. When there are multiple types of surface target molecules, each of the surface target molecules may be detected in any order. When there are multiple types of internal target molecules, each of the internal target molecules may be detected in any order. The detection of the surface target molecule and the detection of the internal target molecule may be performed simultaneously or independently at different times.

The detection of the surface target molecule and the detection of the internal target molecule may be performed under the same condition. Simultaneously detecting the surface target molecule and the internal target molecule under the same condition simplifies the method according to the present embodiment.

In the detection of the surface target molecule and the detection of the internal target molecule, when two or more types of target molecules are simultaneously detected, or when coexisting target molecules, which are detectable even if not simultaneously, are sequentially detected, it is necessary to design a reaction system so that signals indicating the presence of each target molecule are not confused. In such a case, the signal to be detected in the detection of the surface target molecule and the signal to be detected in the detection of the internal target molecule are preferably distinguishable from each other.

Furthermore, when there are multiple types of surface target molecules, the signals indicating the presence of the respective surface target molecules are also preferably distinguishable from each other. Similarly, when there are multiple types of internal target molecules, the signals indicating the presence of the respective internal target molecules are also preferably distinguishable from each other.

For example, when a fluorescence signal is used for the detection, the wavelength of the excitation light and fluorescence are set to different ranges, so that signals are distinguishable from each other. Alternatively, for example, the signals can be made distinguishable by using different signals such as a fluorescence signal and a magnetic signal.

The method of the present embodiment may be performed in the order of the sealing of the structure in each well, the detection of the surface target molecule, the extraction of the contents of the structure, and the detection of the internal target molecule. That is, after sealing the structure in each well, the surface target molecule present on the surface of the structure is detected. Subsequently, the contents of the structure are extracted. Thus, the internal target molecule is exposed inside the well. After that, the internal target molecule may be detected. In this case, even when the signal for detecting the surface target molecule and the signal for detecting the internal target molecule are identical, the surface target molecule and the internal target molecule can be distinguished depending on the point in time of the detection.

When the surface target molecule is detected before extracting the contents of the structure, the detection of the surface target molecule is performed under the condition in which the extraction of the internal target molecule does not occur. For example, the surface target molecule may be detected at a temperature lower than the temperature at which the contents of the structure are extracted, and more specifically, at a temperature in the range from room temperature to approximately 60° C.

Alternatively, the detection of the surface target molecule and the detection of the internal target molecule may be performed after the extraction of the contents of the structure.

Alternatively, the order of the steps including the sealing of the structure in each well, the extraction of the contents of the structure, the detection of the surface target molecule, and the detection of the internal target molecule may be changed or any two of the steps may be performed simultaneously. For example, the extraction step may be performed after the introduction of the structure in each well and before the sealing step of the structure in the well. In such a case, the introduction step and the extraction step may be simultaneously performed. Further, as described above, part of the surface target molecule detection step or the internal target molecule detection step may be performed before the extraction step.

Detection of Structure

The method of the present embodiment may further include a step for detecting the structure. The detection of the structure can be performed at any point in time in the method of the above embodiment. For example, the detection of the structure may be performed after introducing the structure into each well and before extracting the contents of the structure. Alternatively, the structure may be detected after the extraction of the contents of the structure.

Alternatively, the detection of the surface target molecule or the detection of the internal target molecule may be performed simultaneously with the detection of the structure. When the detection of the surface target molecule, the detection of the internal target molecule, and the detection of the structure are performed simultaneously, the same as above applies in that the reaction system is configured so that the detection signals do not interfere with each other.

The structure may be directly detected by a method such as bright field observation. Alternatively, the structure may be indirectly detected by a method such as detecting the molecule included in the structure by the same operation as when the surface target molecule or the internal target molecule is detected. Examples of the latter include detecting the structure using a fluorescent dye for staining a cell membrane, and an antibody or the like that recognizes a virus coat protein.

Method for Evaluating Structure

One embodiment of the present invention provides a method for evaluating a structure including bringing a dispersion liquid of structures into contact with a well array including multiple wells and introducing one or less than one structure into each well, bringing a sealing solution into contact with the well array to seal the structure in each well, extracting contents of each structure in the associated well, detecting at least one type of surface target molecule present on a surface of each structure in the well, detecting at least one type of internal target molecule present inside each structure in the well, and evaluating each structure based on the detection result of the surface target molecule and the detection result of the internal target molecule.

The method of the present embodiment detects the presence or absence of the surface target molecule and the internal target molecule in each well. As a result, the surface target molecule and the internal target molecule are associated with the structure when they are detected. That is, the surface target molecule and the internal target molecule can be detected at a level of single structure. The expression "to evaluate the structure" indicates, as described above, detecting the surface target molecule and the internal target molecule while associating them with the structure. The origin, the state, or the like of the structure may be analyzed by evaluating the structure.

Kit

One embodiment of the present invention provides a kit for detecting the surface target molecule and the internal target molecule of the structure. The kit includes a well array including multiple wells, a reagent that extracts contents of the structure, a reagent that detects at least one type of surface target molecule that is present on a surface of the structure, and a reagent that detects at least one type of internal target molecule that is present inside the structure.

The well array may configure the above-described fluid device. The reagent that extracts the contents from the structure (that is, the extractant), the reagent that detects the surface target molecule, and the reagent that detects the internal target molecule are the same as those described above.

The kit of the present embodiment enables the detection of the surface target molecule and the internal target molecule of the structure in a suitable manner.

EXAMPLES

The present invention will be hereinafter described in further detail based on examples. The present invention should not be limited to any of these examples.

Example 1

Detecting Protein on Virus Surface and Nucleic Acid in Virus

The surface target molecule and the internal target molecule of the structure were detected. An f1 phage, which is a type of virus, (reagent name: *Escherichia coli* phage f1,

Preparation of Nucleic Acid Detection Reagent

The ICA reaction solution having the composition shown in Table 1 below was prepared. The reaction solution is for detecting the nucleic acid by an ICA reaction. In Table 1, Alexa 488 and Redmond RED (indicated as RED in Table 1) are fluorescent dyes, and BHQ-1 (indicated as BHQ in Table 1) and Eclipse are quenchers.

TABLE 1

| Final concentration | Reagent | Base sequence |
|---|---|---|
| 0.5 μm | Allele probe 1 | 5'-CGCGCCGAGGGCCTAATTTGCCAGTTAC-3' (SEQ ID No: 3) |
| 0.5 μm | Allele probe 2 | 5'-ACGGACGCGGAGGATTGCTCACAGAAGGA-3' (SEQ ID No: 4) |
| 1 μm | ICA oligo 1 | 5'-GCTAACGAGCGTCTTTCCAGAT-3' (SEQ ID No: 5) |
| 1 μm | ICA oligo 2 | 5'-GCATGGTTCCAATTTGGGTGAT-3' (SEQ ID No: 6) |
| 4 μm | Alexa 488-BHQ | 5'-T($\alpha$)TCT($\beta$)AGCCGGTTTTCCGGCTGAGACCTCGGCGCG-3' (SEQ ID No: 7) Here, $\alpha$ indicates that the first residue is modified by Alexa 488, and $\beta$ indicates that the fourth residue is modified by BHQ-1. |
| 4 μm | RED-Eclipse | 5'-T($\gamma$)CT($\delta$)TCGGCCTTTTGGCCGAGAGACTCCGCGTCCGT-3' (SEQ ID No: 8) Here, $\gamma$ indicates that the first residue is modified by Redmond Red, and $\delta$ indicates that the third residue is modified by Eclipse. |
| 0.1 mg/mL | Flap endonuclease (FEN)-1 | — |
| 50 mM | Tris-HCl (pH8.5) | — |
| 20 mM | $MgCl_2$ | — |
| 0.05% | Tween 20 | — |

National Institute of Technology and Evaluation, Model No.: NBRC20010) was used as a structure. Also, as the surface target molecule, a coat protein, which is a surface protein of an f1 phage (in which a base sequence of 5'-ACGTTAAACAAAAAATCGTTTCTTATTTGGAT-TGGGATAAATAATATGGCT GTTTAT-TTTGTAACTGGCAAATTAGGCTCTGGAAA-GACGCTCGTTAGCGTTG GTAAGATTCAGGATAAAAT-TGTAGCTGGGTGCAAAAT-3' (SEQ ID No: 1) is included as an encapsulated DNA) was detected. In addition, as the internal target molecule, the base sequence on the genomic DNA of the f1 phage (5'-GTAACTGGCAAATT-AGGCTCTGGAAAGACGCTCGTTAGC-3', SEQ ID No: 2) was detected. Further, in the introduction of the structure into the wells, magnetic beads having an antibody as the specific binding substance were used as the capture substance.

Subsequently, a solution (solution A) was prepared by mixing the ICA reaction solution and BugBuster (manufactured by Merck Millipore Ltd.), which is a protein extraction reagent, at a volume ratio of 1:1.

Preparation of Capture Substance

The capture substance that captures the f1 phage was prepared. Specifically, as the capture substance, magnetic beads on which an anti-f1 phage antibody was immobilized were prepared.

First, the anti-f1 phage antibody (type "Anti-M-13 Phage Coat Protein", Funakoshi. Co., Ltd.) was added to a carboxyl group-modified magnetic bead (Magnosphere, LC 300, JSR Corporation) solution, and the reaction was allowed to proceed for 30 minutes using a rotator. Subsequently, a condensing agent EDC (1-Ethyl-3-(3-dimethylaminopropyl) carbodiimide) was added, and the reaction was carried out for 3 hours to immobilize the anti-f1 phage antibody on the carboxyl group-modified magnetic beads.

Subsequently, in order to remove unreacted antibody and reagent, antibody-immobilized magnetic beads were magnetically captured using a magnetic stand. Subsequently, washing was repeated three times by using PBS-T (0.1% Tween 20-containing PBS (Phosphate-buffered saline)) to prepare the antibody-immobilized magnetic beads. Thus, the capture substance that captures the f1 phage was prepared.

Preparation of Nucleic Acid-Labeled Anti-f1 Phage Antibody

DNA fragment (5'-TTTGT-CACTGTTCCTCCTTTTGTTTTCCTTTCTGT-GAGCAATCTCACCCAAA TTGGAACCATGCTGTATA-CAGTT-3', SEQ ID No: 9) was bound to the anti-f1 phage antibody (type "Anti-M-13 Phage Coat Protein", Funakoshi Co., Ltd.) to prepare a nucleic acid-labeled anti-f1 phage antibody. A commercially available kit (trade name "Protein-Oligo Conjugation Kit", Solulink) was used for binding DNA fragments.

Reaction of f1 Phage and Antibody-Immobilized Beads

The concentration of the f1 phage is represented as a dilution ratio in which the concentration of the commercially available f1 phage suspension is taken as 100%. The f1 phage (final concentration of 0% or final concentration of 1%), 100 µg/mL of the above-described antibody-immobilized magnetic beads, and 10 ng/mL of the above-described nucleic acid-modified anti-f1 phage antibody were mixed so as to have the total amount of 100 µL, which was then allowed to react for an hour at room temperature on a rotator. In a case in which the f1 phage was present, when the anti-f1 phage antibody recognized and bound to a coat protein on the f1 phage surface, a complex was formed with the antibody-immobilized magnetic bead.

Subsequently, the magnetic beads were magnetically collected using a magnetic stand, removal of the supernatant and addition of PBS-T were performed three times for washing, and finally the supernatant was removed.

Introduction Step

Subsequently, 20 µL of the antibody-immobilized magnetic beads suspended in the above-described solution A (mixture of the ICA reaction solution and BugBuster (manufactured by Merck Millipore Ltd.)) was supplied to the fluid device configured as shown in FIG. 1 and brought into contact with the well array. As a result, the antibody-immobilized magnetic beads were introduced into the wells.

The wells of the fluid device used in the present example had a diameter of 5 µm and a depth of 3 µm. Additionally, the height of the flow path was 100 µm.

Sealing Step

Then, 150 µL of FC-40 (Sigma) was supplied as a sealing solution and brought into contact with the well array. As a result, each well was individually sealed, so that the antibody-immobilized magnetic bead was sealed. By the above operation, when the antibody-immobilized magnetic bead had formed a complex with the f1 phage, one or less than one f1 phage was sealed in each well.

Extraction Step

Subsequently, the above fluid device was set on a hot plate and allowed to react at 66° C. for 15 minutes. Thus, the capsid structure of the f1 phage was disrupted and genomic DNA, which is the contents of the f1 phage, was extracted in the sealed wells.

Surface Target Molecule Detection Step and Internal Target Molecule Detection Step Subsequently, the above fluid device that had been through the extraction step was set on a hot plate and allowed to react at 66° C. for 15 minutes. Thus, the surface target molecule and the internal target molecule were simultaneously detected.

More specifically, the allele probe 1 and the ICA oligo 1 each hybridized with the base sequence (SEQ ID No: 2) on the genomic DNA and formed a flap structure. Subsequently, FEN-1 recognized the flap structure and cleaved the allele probe 1.

Subsequently, the fragment of the released allele probe 1 hybridized with RED-Eclipse and formed a flap structure. Subsequently, FEN-1 recognized the flap structure and cleaved RED-Eclipse. As a result, the fluorescent substance and the quencher were separated and a fluorescence signal of Redmond RED was generated.

Similarly, the allele probe 2 and the ICA oligo 2 each hybridized with the DNA fragment modified by the nucleic acid-labeled anti-f1 phage antibody and formed a flap structure. Subsequently, FEN-1 recognized the flap structure and cleaved the allele probe 2.

Subsequently, the fragment of the released allele probe 2 hybridized with Alexa 488-BHQ and formed a flap structure. Subsequently, FEN-1 recognized the flap structure and cleaved Alexa 488-BHQ. As a result, the fluorescent substance and the quencher were separated and a fluorescence signal of Alexa 488 was generated.

Fluorescence Observation of Well

After the surface target molecule detection step and the internal target molecule detection step, images of fluorescence signals of the wells of the fluid device were taken using a fluorescence microscope BZ-710 (KEYENCE Corporation). A 10× magnification objective lens was used.

In fluorescence observation of Alexa 488, the exposure time was set to 3000 msec, and a fluorescent filter for green fluorescent protein (GFP) was used. In fluorescence observation of Redmond RED, the exposure time was set to 2000 msec, and a fluorescent filter for Texas Red was used.

Figure 9:
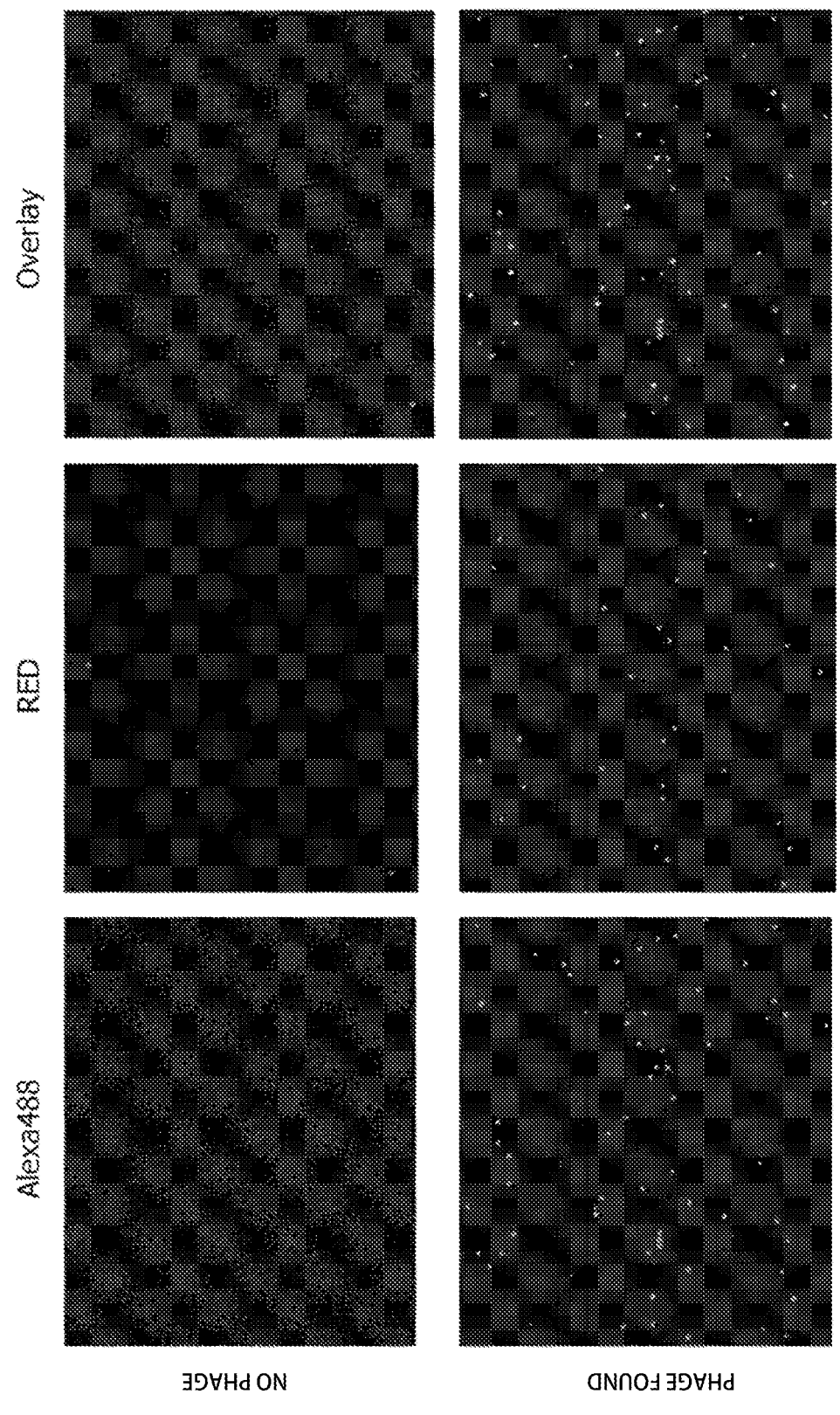
FIG. 9 shows images indicating the results of fluorescence observation according to Example 2.

FIG. 9 shows images of the results of the fluorescence observation. In FIG. 9, "No phage" indicates that the images are the results of the f1 phage with the virus concentration of 0%. "Phages found" indicates that the images are the results of the f1 phage with the virus concentration of 1%.

Furthermore, "Alexa 488" indicates that the images are the results obtained by detecting the fluorescence of Alexa 488, "RED" indicates that the images are the results obtained by detecting the fluorescence of Redmond RED, and "Overlay" indicates that the images are the results obtained by superimposing the detection result of the fluorescence of Alexa 488 and the detection result of the fluorescence of Redmond RED. The number of wells in which the fluorescence was detected is shown in Table 2 below.

TABLE 2

|  | Alexa 488 (nucleic acid fragment with SEQ ID No: 2) | RED (coat protein) | Overlay |
|---|---|---|---|
| No phage | 0 well | 2 wells | 0 well |
| Phage found | 62 wells | 32 wells | 23 wells |

As a result, it became apparent that the nucleic acid fragment of SEQ ID No: 2 was detected in 23 wells among 32 wells in which the coat protein of the phage was detected. That is, the genomic DNA of the phage was detected in approximately 72% wells of the wells in which the coat protein of the phage was detected. The result indicates that the surface target molecule and the internal target molecule of the structure can be associated with high accuracy when they are detected.

Example 2

Study on Concentration of Extraction Reagent

The concentration of the reagent (extraction reagent) that extracts the contents of the structure in the extraction step was studied. An f1 phage, which is a type of virus, (reagent name: *Escherichia coli* phage f1, National Institute of Technology and Evaluation, Model No.: NBRC20010) was used as a structure. Additionally, as the internal target molecule, the base sequence (SEQ ID No: 2) on the genomic DNA of the f1 phage was detected.

Preparation of Nucleic Acid Detection Reagent

The ICA reaction solution having the composition shown in Table 3 below was prepared. In Table 3, Alexa 488 is a fluorescent dye, and BHQ-1 (indicated as BHQ in Table 3) is a quencher.

Subsequently, solutions were prepared by mixing the ICA reaction solution and BugBuster (manufactured by Merck Millipore Ltd.), which is a protein extraction reagent, at volume ratios of 9:1, 1:1, and 1:9. As a negative control, a sample that does not include the f1 phage was also prepared.

Subsequently, each sample was set on a real-time PCR device (type "LightCycler 480", Roche) and allowed to react at 65° C. for 60 minutes, and the fluorescence signal of Alexa 488 was measured over time.

Figure 10:
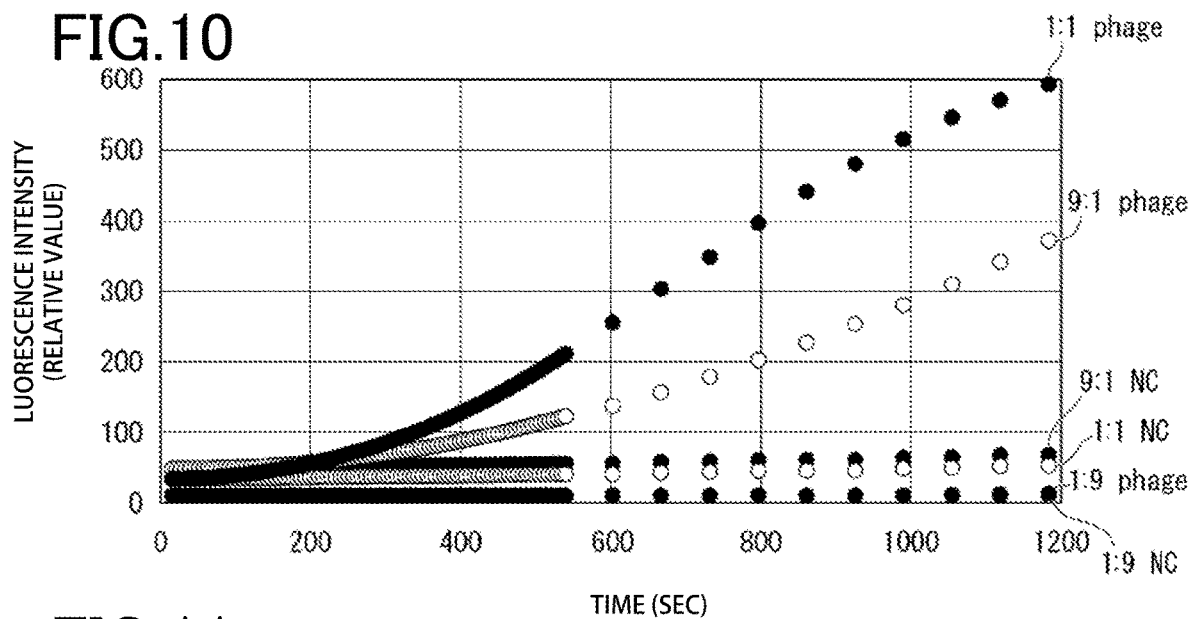
FIG. 10 is a graph showing the measurement results of changes over time of fluorescence signals according to Example 3.

FIG. 10 is a graph showing the results obtained by measuring the changes of the fluorescence signals over time. In FIG. 10, "9:1 NC" indicates the result of a sample in which the ICA reaction solution that does not contain the f1 phage and BugBuster (manufactured by Merck Millipore Ltd.) were mixed at a volume ratio of 9:1. "9:1 phage" indicates the result of a sample in which the ICA reaction solution (containing the f1 phage) and BugBuster (manufactured by Merck Millipore Ltd.) were mixed at a volume ratio of 9:1. "1:1 NC" indicates the result of a sample in which the ICA reaction solution that does not contain the f1 phage and BugBuster (manufactured by Merck Millipore Ltd.) were mixed at a volume ratio of 1:1. "1:1 phage" indicates the result of a sample in which the ICA reaction solution (containing the f1 phage) and BugBuster (manufactured by Merck Millipore Ltd.) were mixed at a volume ratio of 1:1. "1:9 NC" indicates the result of a sample in which the ICA reaction solution that does not contain the f1 phage and BugBuster (manufactured by Merck Millipore Ltd.) were mixed at a volume ratio of 1:9. "1:9 phage" indicates the result of a sample in which the ICA reaction solution (containing the f1 phage) and BugBuster (manufactured by Merck Millipore Ltd.) were mixed at a volume ratio of 1:9.

As a result, it became apparent that when the volume ratio of BugBuster is excessively high, the ICA reaction is hindered.

TABLE 3

| Final concentration | Reagent | Base sequence |
|---|---|---|
| 0.5 μm | Allele probe 1 | 5'-CGCGCCGAGGGCCTAATTTGCCAGTTAC-3' (SEQ ID No: 3) |
| 1 μm | ICA oligo 1 | 5'-GCTAACGAGCGTCTTTCCAGAT-3' (SEQ ID No: 5) |
| 4 μm | Alexa 488-BHQ | 5'-T(α)TCT(β)AGCCGGTTTTCCGGCTGAGACCTCGGCGCG-3' (SEQ ID No: 7) Here, α indicates that the first residue is modified by Alexa 488, and β indicates that the fourth residue is modified by BHQ-1. |
| 0.1 mg/mL | Flap endonuclease (FEN)-1 | — |
| 50 mM | Tris-HCl (pH8.5) | — |
| 20 mM | $MgCl_2$ | — |
| 0.05% | Tween 20 | — |
| 1% | f1 phage | — |

Example 3

Study on Extraction Step

In the present example, a study of the conditions for extracting the contents from the structure was conducted. An f1 phage, which is a type of virus, (reagent name: *Escherichia coli* phage f1, National Institute of Technology and Evaluation, Model No.: NBRC20010) was used as a structure. Additionally, the base sequence "SEQ ID No: 2" on the genomic DNA of the f1 phage was detected as the internal target molecule.

Preparation of Nucleic Acid Detection Reagent

The ICA reaction solution having the composition shown in Table 4 below was prepared. The reaction solution is for detecting the nucleic acid by an ICA reaction. In Table 4, Alexa 488 is a fluorescent dye, and BHQ-1 (indicated as BHQ in Table 4) is a quencher. In Table 4, "MOPS" represents 3-morpholinopropanesulfonic acid.

TABLE 4

| Final concentration | Reagent | Base sequence |
|---|---|---|
| 0.5 μm | Allele probe 1 | 5'-CGCGCCGAGGGCCTAATTTGCCAGTTAC-3' (SEQ ID No: 3) |
| 1 μm | ICA oligo 1 | 5'-GCTAACGAGCGTCTTTCCAGAT-3' (SEQ ID No: 5) |
| 4 μm | Alexa 488-BHQ | 5'-T(α)TCT(β)AGCCGGTTTTCCGGCTGAGACCTCGGCGCG-3' (SEQ ID No: 7) Here, α indicates that the first residue is modified by Alexa 488, and β indicates that the fourth residue ismodified by BHQ-1. |
| 0.1 mg/mL | Flap endonuclease (FEN)-1 | — |
| 50 mM | MOPS (pH7.9) | — |
| 20 mM | $MgCl_2$ | — |

Subsequently, the following Samples 1 to 4 were prepared in attempts to extract the contents of the phage under various conditions.

Sample 1: the phage (10%) was subjected to sonication for one minute using a probe type ultrasonic generator Sample 2: BugBuster (manufactured by Merck Millipore Ltd.) was added to the phage (10%) at a volume ratio of 50%, which was then stirred at 37° C. for thirty minutes.

Sample 3: the phage (10%) was heated at 70° C. for thirty minutes. Sample 4: BugBuster (manufactured by Merck Millipore Ltd.) was added to the phage (10%) at a volume ratio of 50%, which was then stirred at 70° C. for thirty minutes.

Subsequently, the above-described TCA reaction solution and each of Samples 1 to 4 were mixed in sample tubes to prepare solutions having a final concentration of the phage concentration of 1% and a volume of 10 mL.

As a negative control, the ICA reaction solution only (Sample 5) and a combined solution of the ICA reaction solution and the phage (Sample 6) were prepared.

As a positive control, a solution (Sample 7) was prepared that is obtained by adding the nucleic acid fragment having the base sequence (SEQ ID No: 2) present on the genomic DNA of the f1 phage to the ICA reaction solution so that the final concentration is 30 μM.

Subsequently, each sample was set on a real-time PCR device (type "LightCycler 480", Roche) and allowed to react at 66° C. for 60 minutes, and the fluorescence signal of Alexa 488 was measured over time.

Figure 11:
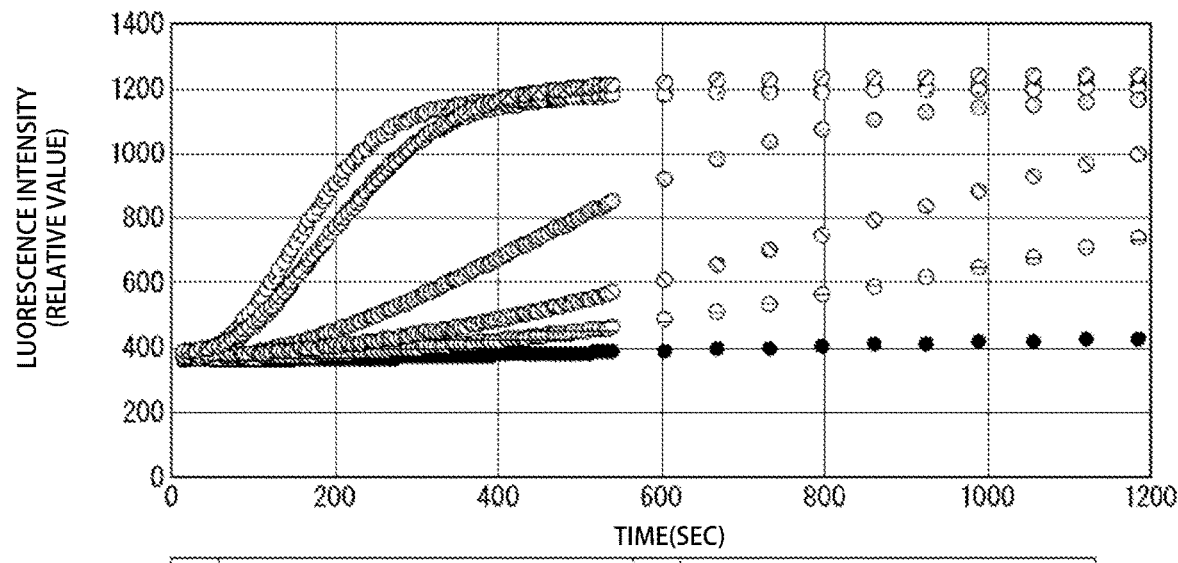
FIG. 11 is a graph showing the measurement results of changes over time of fluorescence signals according to Example 4.

FIG. 11 is a graph showing the results obtained by measuring the changes of the fluorescence signals over time. In FIG. 11, the horizontal axis represents the reaction time (sec), and the vertical axis represents the fluorescence intensity (relative value). In FIG. 11, "ICA" indicates the ICA solution, "phage" indicates the phage, and "bug" indicates BugBuster (manufactured by Merck Millipore Ltd.).

As a result, the increase in the fluorescence intensity was detected in all of Sample 1 in which the phage was subjected to sonication, Sample 2 in which BugBuster (manufactured by Merck Millipore Ltd.) was added to the phage, Sample 3 in which the phage was subjected to heating at 70° C., Sample 4 in which BugBuster (manufactured by Merck Millipore Ltd.) was added to the phage and which was subjected to heating at 70° C. for thirty minutes, and Sample 7 of the positive control.

Additionally, the increase in the fluorescence intensity was significant in Sample 1 in which the phage was subjected to sonication and Sample 4 in which BugBuster (manufactured by Merck Millipore Ltd.) was added to the phage and which was subjected to heating at 70° C. for thirty minutes. In the meantime, little increase in the fluorescence intensity was observed in the ICA reaction solution only (Sample 5), which was prepared as the negative control. Furthermore, in the combined solution of the ICA reaction solution and the phage (Sample 6), an increase in the fluorescence intensity was observed as the time elapsed, but the level of increase was only moderate compared with Samples 1 to 4.

It is an aspect of the present invention to provide a technique for detecting a target molecule that is present outside and inside a structure.

The present invention has the following aspects.

[1] A method for detecting a surface target molecule and an internal target molecule of a structure. The method includes bringing a dispersion liquid of structures into contact with a well array including a plurality of wells and introducing the structures into the wells, bringing a sealing solution into contact with the well array to seal the structures in the wells, extracting contents of each structure in the associated well, detecting at least one type of surface target molecule that is present on a surface of each structure in the well, and detecting at least one type of internal target molecule that is present inside each structure in the well.

[2] The method according to [1], wherein extracting the contents of each structure, detecting the surface target molecule, and detecting the internal target molecule are performed after sealing the structures in the wells.

[3] The method according to [1] or [2], wherein detecting the surface target molecule and detecting the internal target molecule are performed after extracting the contents of each structure.

[4] The method according to any one of [1] to [3], wherein detecting the surface target molecule and detecting the internal target molecule are simultaneously performed.

[5] The method according to any one of [1] to [4], wherein detecting the surface target molecule and detecting the internal target molecule are performed under the same conditions.

[6] The method according to any one of [1] to [5], wherein each of the surface target molecule and the internal target molecule is at least one type of molecule selected from a group consisting of a nucleic acid, a protein, a sugar, a lipid, and a complex thereof.

[7] The method according to any one of [1] to [6], wherein the surface target molecule includes a protein, and the internal target molecule includes a nucleic acid.

[8] The method according to any one of [1] to [7], wherein detecting the internal target molecule is performed by a nucleic acid detection technique.

[9] The method according to [8], wherein the nucleic acid detection technique includes Invasive Cleavage Assay.

[10] The method according to any one of [1] to [9], wherein a signal to be detected in detecting the surface target molecule and a signal to be detected in detecting the internal target molecule are distinguishable from each other.

[11] The method according to any one of [1] to [10], wherein each structure is any one selected from a group consisting of a virus, an exosome, a cell, and an endoplasmic reticulum.

[12] The method according to any one of [1] to [11], wherein each structure forms a complex with a capture substance, and the capture substance is a bound body of a solid phase and a specific binding substance to the structure.

[13] The method according to [12], wherein the specific binding substance is an antibody.

[14] The method according to any one of [1] to [13], wherein extracting the contents of each structure includes heating the structure in a liquid containing a surfactant.

[15] The method according to any one of [1] to [14], wherein, in introducing the structures into the wells, one or less than one structure is introduced into each well.

[16] A method for evaluating a structure includes detecting the presence or absence of the surface target molecule and the internal target molecule per well by the method according to [15] and evaluating the structure based on the detection result of the surface target molecule and the detection result of the internal target molecule.

[17] A kit for detecting a surface target molecule and an internal target molecule of a structure. The kit includes a well array including a plurality of wells, a reagent that extracts contents of the structure, a reagent that detects at least one type of surface target molecule that is present on a surface of the structure, and a reagent that detects at least one type of internal target molecule that is present inside the structure.

The present invention in one aspect provides a technique for detecting a target molecule that is present outside and inside a structure.

INDUSTRIAL APPLICABILITY

The present invention provides a technique for detecting a target molecule that is present outside and inside a structure.

REFERENCE SIGNS LIST 100, 200 . . . Fluid device
110 . . . Substrate
120 . . . Cover member
121 . . . Protruding portion
122 . . . Inlet port
123 . . . Discharge port
130 . . . Flow path
140 Well array
141 . . . Well
142 . . . Micro-compartment
L110 . . . Reagent solution
L120 . . . Sealing solution
142R . . . Well in which signal is detected
210 Wall member
700, 700' . . . Structure
710 . . . Surface target molecule
720 . . . Internal target molecule
800 . . . Capture substance
810 . . . Specific binding substance Obviously, numerous modifications and variations of the present invention are possible in light of the above teachings. It is therefore to be understood that within the scope of the appended claims, the invention may be practiced otherwise than as specifically described herein.

What is claimed is:

1. A method for detecting a target molecule of a structure body, the method comprising:

contacting a dispersion liquid comprising a structure body, reagents for detecting a surface target molecule and an internal target molecule of the structure body, and optionally other reagents, with a fluid device comprising a substrate containing a well array including a plurality of wells such that the structure body and the dispersion liquid are introduced into the wells;

wherein in the contacting of the dispersion liquid with the well array one or less structure body per well is introduced;

wherein the fluid device further comprises a cover member on top the substrate and a flow path between the substrate and the cover member, wherein the cover member comprises an inlet port on one end of the flow pass of the fluid device and an outlet port on the other end, wherein the contacting comprises introducing the dispersion liquid to the flow path between the substrate having the well array on it and the cover member through the inlet port such that the dispersion liquid flows downward from the inlet through the flow path over the surface of the well array, covers the surface of the well array, and enters each well, binding a capture substance, capable of capturing the structure body, to the structure body, comprising bringing the structure body into contact with the capture substance before introducing the structure body into the wells, or adding the capture substance into the dispersing liquid containing the structure body, or introducing the capture substance into each well and then introducing the dispersing liquid containing the structure body such that the capture substance and the structure body are brought into contact with each other in the wells and form a complex, bringing a sealing solution into contact with the well array such that the structure body is sealed in at least one of the wells;

wherein the sealing solution is introduced through the inlet port, replaces the dispersion liquid that is not accommodated in the wells from the dispersion liquid supplied to the flow path, and expels the dispersion liquid through the outlet port, and wherein the sealing solution individually seals each of the wells which accommodate the dispersion liquid containing the structure body, extracting a content of the structure body in the wells;

detecting the presence of the surface target molecule present on a surface of the structure body in the wells, and detecting the presence of the internal target molecule inside the structure body in the wells, wherein the detecting the surface target molecule and the detecting the internal target molecule are conducted under same conditions in the same well, wherein the surface target molecule and the internal target molecule emit different signals, and the detecting comprises amplification of the signals by an invasive cleavage assay (ICA) reaction, and wherein the other reagents in the dispersion liquid comprise reagents for the ICA reaction, and wherein the surface target molecule is a protein, and the internal target molecule is a nucleic acid.

2. The method according to claim 1, wherein the extracting, the detecting of the surface target molecule, and the detecting of the internal target molecule are conducted after the bringing of the sealing solution into contact.

3. The method according to claim 1, wherein the detecting of the surface target molecule and the detecting of the internal target molecule are conducted after the extracting.

4. The method according to claim 1, wherein the detecting of the surface target molecule and the detecting of the internal target molecule are conducted simultaneously.

5. The method according to claim 1, wherein the structure body comprises at least one selected from the group consisting of a virus, an exosome, a cell, and an endoplasmic reticulum.

6. The method according to claim 1, wherein the structure body forms a complex with the capture substance, and the capture substance is a bound body of a solid phase and a specific binding substance to the structure body.

7. The method according to claim 6, wherein the specific binding substance comprises an antibody.

8. The method according to claim 1, wherein the extracting comprises heating the structure body in a liquid including a surfactant.

9. A method for detecting analyzing a structure body, the method comprising:
    detecting a presence or absence of the surface target molecule and the internal target molecule in each of the wells by the method of claim 1, and
    analyzing the structure body based on a result of the detecting of the presence or absence of the surface target molecule and the internal target molecule.

* * * * *

SEQUENCE LISTING

<160> NUMBER OF SEQ ID NOS: 9

<210> SEQ ID NO 1
<211> LENGTH: 140
<212> TYPE: DNA
<213> ORGANISM: Bacteriophage f1

<400> SEQUENCE: 1
acgttaaaca aaaaatcgtt tcttatttgg attgggataa ataatatggc tgtttatttt      60
gtaactggca aattaggctc tggaaagacg ctcgttagcg ttggtaagat tcaggataaa     120
attgtagctg ggtgcaaaat                                                 140

<210> SEQ ID NO 2
<211> LENGTH: 39
<212> TYPE: DNA
<213> ORGANISM: Bacteriophage f1

<400> SEQUENCE: 2
gtaactggca aattaggctc tggaaagacg ctcgttagc                          39

<210> SEQ ID NO 3
<211> LENGTH: 28
<212> TYPE: DNA
<213> ORGANISM: Artificial Sequence
<220> FEATURE:
<223> OTHER INFORMATION: Synthesized oligonucleotide named allele probe
      1

<400> SEQUENCE: 3
cgcgccgagg gcctaatttg ccagttac                                      28

<210> SEQ ID NO 4
<211> LENGTH: 30
<212> TYPE: DNA
<213> ORGANISM: Artificial Sequence
<220> FEATURE:
<223> OTHER INFORMATION: Synthesized oligonucleotide named allele probe
      2

<400> SEQUENCE: 4
acggacgcgg aggattgctc acagaaagga                                    30

<210> SEQ ID NO 5
<211> LENGTH: 22
<212> TYPE: DNA
<213> ORGANISM: Artificial Sequence
<220> FEATURE:
<223> OTHER INFORMATION: Synthesized oligonucleotide named ICA oligo 1

<400> SEQUENCE: 5
gctaacgagc gtctttccag at                                            22

<210> SEQ ID NO 6
<211> LENGTH: 22
<212> TYPE: DNA
<213> ORGANISM: Artificial Sequence
<220> FEATURE:
<223> OTHER INFORMATION: Synthesized oligonucleotide named ICA oligo 2

<400> SEQUENCE: 6
gcatggttcc aatttgggtg at                                            22

<210> SEQ ID NO 7
<211> LENGTH: 34
<212> TYPE: DNA
<213> ORGANISM: Artificial Sequence
<220> FEATURE:
<223> OTHER INFORMATION: Synthesized oligonucleotide named Alexa488-BHQ
<220> FEATURE:
<221> NAME/KEY: misc_feature
<222> LOCATION: (1)..(1)
<223> OTHER INFORMATION: modified with Alexa488
<220> FEATURE:
<221> NAME/KEY: misc_feature
<222> LOCATION: (4)..(4)
<223> OTHER INFORMATION: modified with BHQ-1

```
<400> SEQUENCE: 7
ttctagccgg ttttccggct gagacctcgg cgcg                           34

<210> SEQ ID NO 8
<211> LENGTH: 35
<212> TYPE: DNA
<213> ORGANISM: Artificial Sequence
<220> FEATURE:
<223> OTHER INFORMATION: Synthesized oligonucleotide named RED-Eculipse
<220> FEATURE:
<221> NAME/KEY: misc_feature
<222> LOCATION: (1)..(1)
<223> OTHER INFORMATION: modified with Redmond Red
<220> FEATURE:
<221> NAME/KEY: misc_feature
<222> LOCATION: (3)..(3)
<223> OTHER INFORMATION: modified with Eculipse

<400> SEQUENCE: 8
tcttcggcct tttggccgag agactccgcg tccgt                          35

<210> SEQ ID NO 9
<211> LENGTH: 75
<212> TYPE: DNA
<213> ORGANISM: Artificial Sequence
<220> FEATURE:
<223> OTHER INFORMATION: Synthesized oligonucleotide

<400> SEQUENCE: 9
tttgtcactg ttcctccttt tgttttcctt tctgtgagca atctcaccca aattggaacc    60
atgctgtata cagtt                                                    75
```